INVENTORS
PETER H. OHRNBERGER
& ORVAL A. OPPERTHAUSER
BY
ATTORNEYS

INVENTORS
PETER H. OHRNBERGER
& ORVAL A. OPPERTHAUSER

ATTORNEYS

INVENTORS
PETER H. OHRNBERGER
& ORVAL A. OPPERTHAUSER
BY
Barnes, Kisselle, Raisch & Choate
ATTORNEYS

United States Patent Office 3,443,458
Patented May 13, 1969

3,443,458
FEED-OUT HEAD FOR MACHINE TOOLS
Peter H. Ohrnberger, Mount Clemens, and Orval A. Oppenthauser, Bloomfield Township, Oakland County Mich., assignors to F. Jos. Lamb Co., Inc., Detroit, Mich., a corporation of Michigan
Filed Mar. 3, 1967, Ser. No. 620,300
Int. Cl. B23b 29/02, 39/02
U.S. Cl. 77—58                                    15 Claims

ABSTRACT OF THE DISCLOSURE

A rotatable tool supporting head for a machine tool having a plurality of axially spaced, radially shiftable tool slides thereon. A shaft extending axially through the head is rotatable independently of the head and has keyed thereto a plurality of cam plates, one for each axially spaced tool slide. Each cam plate has a spiral cam groove therein in which is engaged a cam follower supported by the associated tool slide. When the shaft is rotated in opposite directions relative to the head each tool slide is shifted radially through its feed stroke and retraction stroke in accordance with the shape of the spiral groove in its associated cam plate. The spiral cam groove for one of the tool slides which supports a tool for cutting a radially extending groove is shaped such that rotation of the cam plate in one direction causes the grooving tool to be shifted through its feed stroke to cut the groove and then to be retracted sufficiently to clear the riadially inner edge of the groove cut by the grooving tool.

---

This invention relates to a feed-out head for a machine tool; that is, a rotating head on which a plurality of cutting tools are mounted and adapted to be actuated radially of the head while the head is rotating to machine a plurality of different surfaces on a part being machined.

Feed-out heads generally of the type described have been designed heretofore so that each of the tools starts and stops its feed stroke at the same time. From the practical standpoint it is desirable in a head of this type to be able to start and stop the feed strokes of the various tools at staggered intervals and to move the tools radially outwardly at various rates depending upon the shape of the workpiece, the depth of the cut being taken and the finish desired. In heads of this type with which I am familar the individual tools are shifted radially on the head by means of axially moving wedges.

It is an object of the present invention to provide a feed-out head for a machine tool which incorporates a plurality of cutting tools which are adapted to be shifted radially on the head by means of cams which are rotatable relative to the head. With a feed-out head of the present invention the operative cam surface of each cam can be shaped to shift the tool radially at any desired point in the rotation of the cam, at any desired rate and through any desired stroke. Furthermore, the use of rotatable cams for controlling the radial movement of the cutting tools permits retraction of one or more tools at the end of their cutting strokes while other tools are still executing their feed strokes.

Other features and objects of the present invention will become apparent from the following description and drawings in which.

Figure 1:
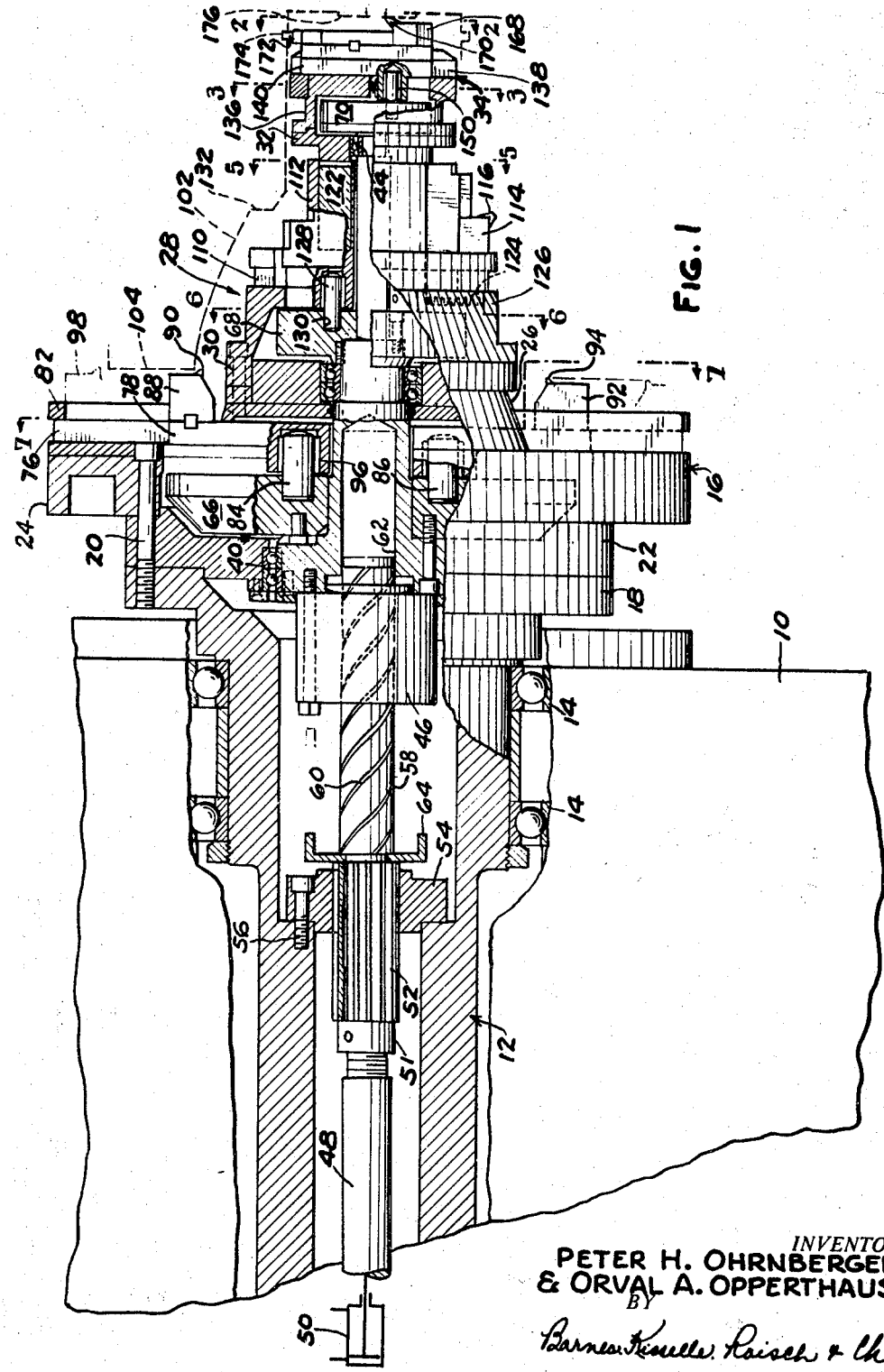
FIGURE 1 is a fragmentary view of a machine tool showing the head of the present invention partially in vertical section and partially in side elevation.
Figure 2:
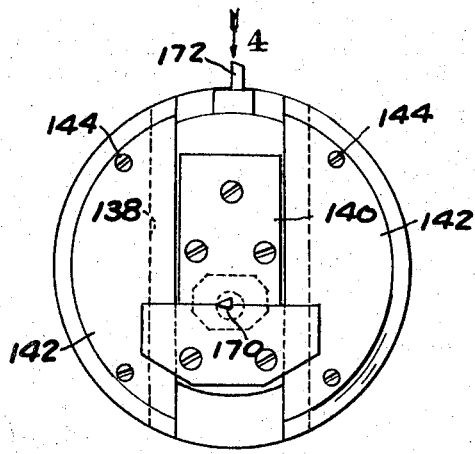
FIGURE 2 is a view of the end of the feed-out head taken along the line 2—2 in FIG. 1.

In FIG. 1 a portion of a machine tool is shown at 10. The portion of the machine tool illustrated comprises a housing in which a hollow driven spindle 12 is journalled by means of bearings 14. The feed-out head of the present invention is generally designated by numeral 16 and is secured to an annular flange 18 of spindle 12 by screws 20.

Head 16 comprises a plurality of axially adjacent sections which are held together by screws. For example, the head includes a base bearing plate 22 which supports a first slide support 24. On the end face of the conically shaped portion 26 of slide support 24 there is mounted a second slide support 28 by screws 30. The right end of the second slide support 28 as viewed in FIG. 1 is defined by an annular plate 32 on which a third slide support 34 is mounted by screws 36 shown in FIG. 3.

Within the head 16 there is journalled a hollow shaft 38. One portion of shaft 38 is journalled within the base bearing plate 22 by a bearing 40. Another portion of shaft 38 is journalled within the second slide support 28 by a bearing 42 and adjacent its free end shaft 38 is journalled within the annular plate 32 by a bearing 44. At its inner end hollow shaft 38 has a nut 46 of the ball recirculating type mounted thereon. An actuator rod 48 is adapted to be shifted axially within spindle 12 by a hydraulic cylinder 50. Actuator rod 48 has a threaded connection with a shaft 51. Shaft 51 has an axially splined portion 52 which is supported in a splined bushing 54 mounted within the bore of spindle 12 by screws 56. Shaft 51 has a cylindrical portion 58 adjacent the splined portion 52. Shaft 38 has a bore portion 62 which accommodates shaft 51 is provided with helical grooves 60 in which the bearing balls in nut 46 engage so that as actuator 48 is shifted axially, nut 46 and the hollow shaft 38 on which it is mounted rotate about the axis of rotation of spindle 12 and head 16.

In the arrangement illustrated in FIG. 1, when actuator 48 is shifted to the right, shaft 38 is caused to rotate in a clockwise direction as viewed in FIGS. 3, 5, 6 and 7. Shaft 38 has a bore portion 62 which accommodates shaft 51 as the latter shifts axially through nut 46. A cup-shaped spring disc 64 is mounted on shaft 51 between the splined portion 52 and the grooved portion 58. Disc 64 is adapted to engage nut 46 to limit the travel of actuator 48 in a direction toward the right as viewed in FIG. 1 and to engage bushing 54 to limit the extent of movement of actuator 48 in a direction to the left. Disc 64 serves as a cushioning member in the event of overtravel of actuator 48.

Figure 7:
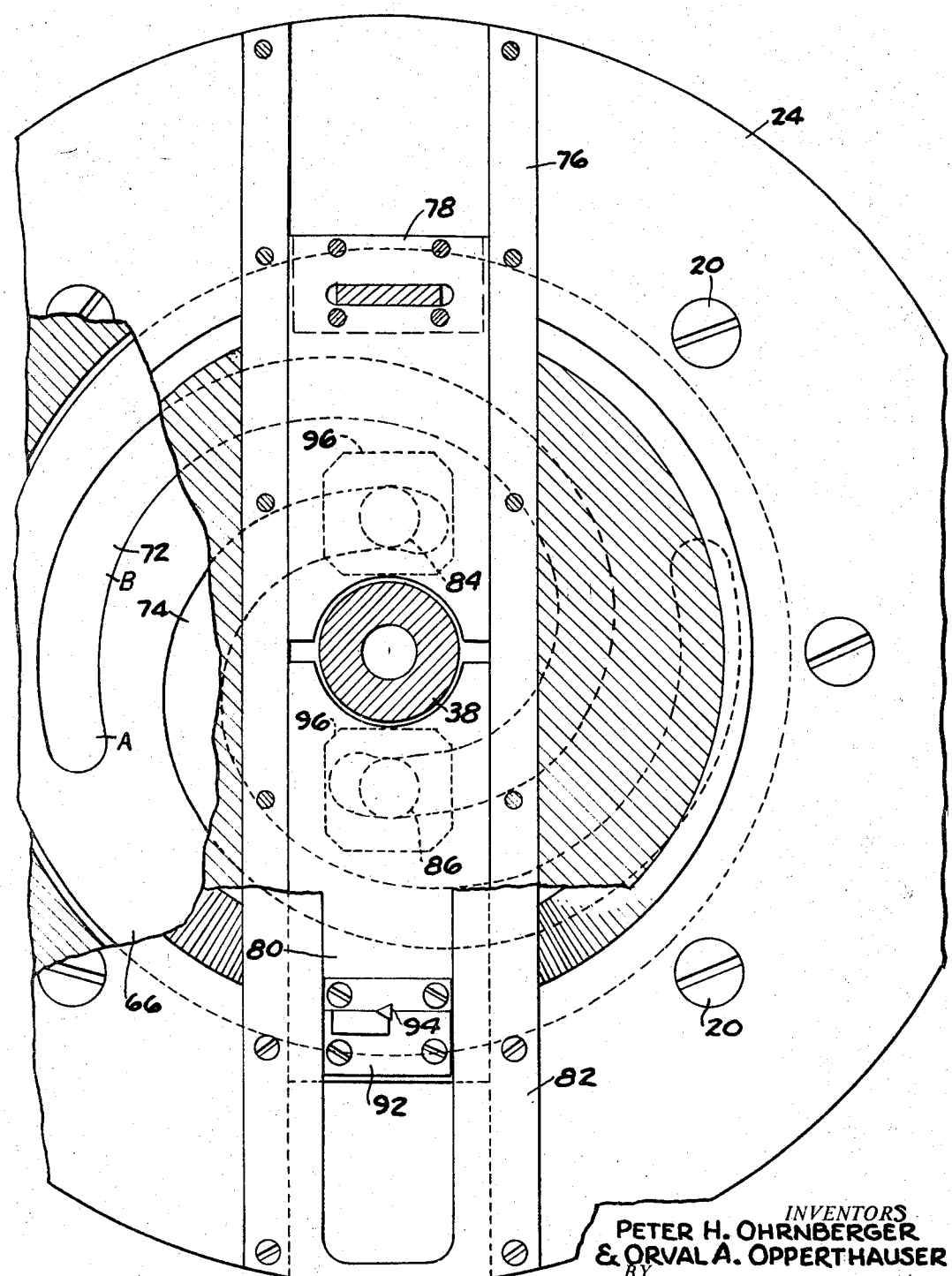
FIGURE 7 is a sectional view along the line 7—7 in FIG. 1.

Three cams 66, 68 and 70 are spaced along shaft 38 and are keyed thereto so as to rotate with shaft 38 as a unit. Referring to FIG. 7, cam 66 is provided on one face thereof with a pair of spiral cam grooves 72, 74. The first slide support 24 carries a U-shaped track member 76 which extends diametrically across support 24. Track 76 forms a radial guide-way for a pair of diametrically opposed tool slides 78, 80 which are retained in the guideway by a gib plate 82. Tool slide 78 carries a pin 84 which is engaged in spiral groove 74 and tool slide 80 carries a pin 86 which engages in spiral cam groove 72 on cam plate 66. A tool block 88 on slide 78 has a cutting tool 90 mounted thereon and a tool block 92 has a cutting tool 94 mounted thereon (FIG. 1). Pins 84, 86 are rotatably journalled on the underside of their respective slides in bosses 96.

In FIG. 7 the two slides 78, 80 are illustrated generally at their radially innermost positions. When cam plate 66 is rotated in a clockwise direction, cam follower pin 84 and cam follower pin 86 which are engaged in cam grooves 74 and 72, respectively, will be shifted radially outwardly away from each other and therefore shift the tool slides 78, 80 radially outwardly in the guideway formed by track member 76 and gib plate 82. In the position illustrated in FIG. 7 the tool slides 78, 80 are shown at the end of feed stroke of the cutting tools. When cam 66 is rotated clockwise the two tools 90, 94 are retracted to the radially outward position shown at 98, 100 in FIG. 1. The workpiece being machined is illustrated by the broken line 102 in FIG. 1 and the surface being machined by tools 90, 94 is designated 104. The two spiral cam grooves 72, 74 are duplicates of one another but are spaced apart angularly 180°. Thus, by proper location of tool 90 on tool block 88 and tool 94 on tool block 92 each of the cutting tools can execute a cut equal to one-half of the advance of the slides per revolution of the entire head.

Figure 3:
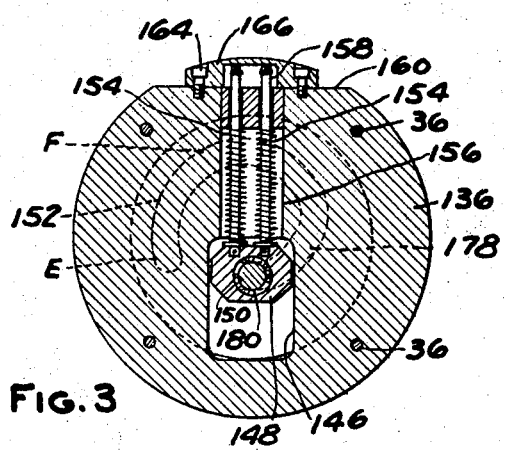
FIGURE 3 is a sectional view taken along the line 3—3 in FIG. 1.
Figure 4:
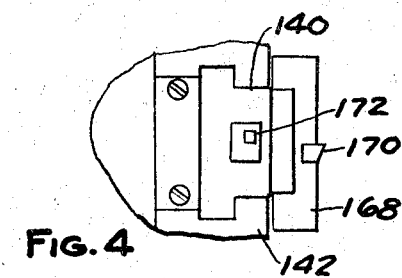
FIGURE 4 is a fragmentary view taken in the direction of the arrow 4 in FIG. 2.

The second slide support 28 includes a pair of radially spaced cylindrical segment sections 106, 108 (FIG. 5) which are spaced apart to provide a guideway 110 for a second tool slide 112. Slide 112 supports a tool block 114 on which a cutting tool 116 is mounted. Slide 112 has an elongated aperture 118 therein through which a reduced portion 120 of shaft 38 projects. Adjacent the end of tool slide 112 opposite the tool block 114 there is provided a large cavity which is filled with lead as at 122. In the case of the tool slide 112 the shape and the size of the slide is such that if the weighted lead portion 122 were not provided the center of gravity of the tool slide would probably pass through the axis of rotation of head 16 as the slide is shifted from the fully retracted to the fully extended position. The provision of the weighted lead section 122 as illustrated assures that the center of gravity of the slide 112 will always be positioned at that side of the axis of rotation of head 16 which is radially opposite the cutting tool 116. Thus, as viewed in FIG. 5, the center of gravity of slide 112 is above the horizontal axis of the head and the cutting tool 116 is radially opposite on the lower side of the axis of rotation of head. For reasons which will be explained more fully hereinafter, a plurality of springs 124 are arranged between slide 112 and a cap 126 on the second slide support 28 (FIG. 3). Springs 124 urge slide 112 in an upwardly direction as viewed in FIG. 5. On its under or back side slide 112 carries a pin 128 which engages a spiral groove 130 formed in cam plate 68. When cam plate 68 is rotated clockwise as viewed in FIG. 6, pin 128 is shifted radially outwardly and causes the tool 116 on slide 112 to be shifted radially inwardly. In the position shown in FIG. 1 tool 116 has completed its feed stroke and has machined the surface 132 on the workpiece 102. Tool 116 moves radially outwardly on its feed stroke and is retracted in a radially inward direction.

Figure 5:
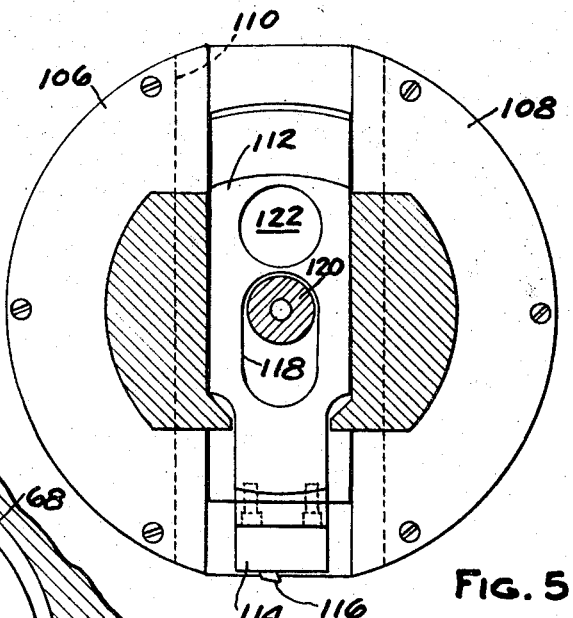
FIGURE 5 is a sectional view along the line 5—5 in FIG. 1.
Figure 6:
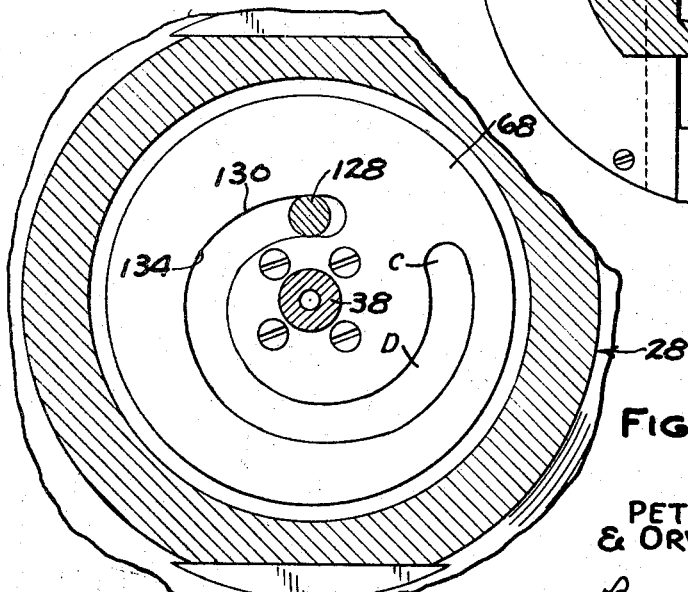
FIGURE 6 is a sectional view along the line 6—6 in FIG. 1.

From an observation of FIGS. 5 and 6 it will be apparent that on the feed stroke of slide 112, while the tool 116 is moving radially outwardly the effect of centrifugal force on slide 112, the force applied to slide 112 by springs 124 and the cutting force on the tool 116 are all directed radially inwardly. Therefore, all the forces acting on slide 112 are acting in the same radial direction throughout the feed stroke of the slide. As a consequence the cam follower pin 128 will be biased against the outer side 134 of spiral groove 130 at all times.

The third slide support 34 includes a base plate 136 which is mounted on the annular plate 32 of the second slide support 28 by screws 36 (FIG. 3). Base plate 136 is formed with a guideway 138 on its outer end face in which is slidably arranged a tool slide 140. Slide 140 is retained in guideway 138 by a pair of gib plates 142 mounted on the outer end face of base plate 36 by screws 144. Base plate 136 is fashioned with an elongated through opening 146 through which a boss 148 on the under or rear side of slide 140 projects. Boss 148 forms a bearing for a cam follower pin 150 which engages in a spiral cam groove 152 in cam plate 70. A pair of springs 154 (FIG. 3) bear against boss 148 and urge cam follower pin 150 in a radially outwardly direction or, as viewed in FIGS. 1 and 3, in a downwardly direction. Springs 154 are housed in a radial socket 156 in base plate 136 and are guided by studs 158. For purpose of assembly base plate 136 is machined with a flat face 160 where socket 156 extends to the periphery of plate 136 and a cover plate 162 is secured to face 160 by screws 164. Cover plate 162 has a socket 166 which accommodates the outer ends of studs 158. Springs 124 which act on tool slide 114 (FIG. 1) are arranged on the second slide support 28 in a manner similar to springs 154 as shown in FIGS. 3.

Tool slide 140 carries a tool block 168 on which two cutting tools 170 and 172 are mounted. Tool 172 is in the nature of a grooving tool for cutting a groove 174 in the workpiece 102. Tool 170 is a facing tool for machining the annular face 176 on the workpiece.

Referring to FIG. 3, it will be noted that the shape of the spiral cam groove 152 differs somewhat from the shape of the came groove 130 on cam 68 and the cam grooves 72, 74 on cam 66. In the case of cam grooves 130, 72, 74 the inner end of the spiral is generally the radially innermost portion of the respective cam grooves. In the case of cam groove 152 the radially innermost portion of the cam groove is located generally at 178 and the inner end 180 of the spiral is located radially outwardly of the portion 178. Thus, as cam plate 70 is rotated in a counter-clockwise direction toward the position shown in FIG. 3 the two cutting tools 170, 172 are actuated through their feed stroke (tool 172 moves radially outwardly and tool moves radially inwardly) until the portion 178 of groove 152 is engaged by pin 150. Thereafter as pin 150 traverses the portion of the groove 152 between the portions 178 and 180, grooving tool 172 is retracted sufficiently to clear the edges of the groove 174 machined in the workpiece so that the workpiece can be withdrawn from the head without retracting the tools associated with tool slides 112, 78 and 80. This feature of the present invention is important in any machining operation where one of the tools is machining a groove. By forming the cam groove for the tool slide on which the grooving tool is mounted such that rotation of the cam plate in one direction produces the complete feed stroke of the grooving tool and also a sufficient retraction of the grooving tool to clear the groove being machined the head can be retracted from within the workpiece without the necessity of retracting the tools controlled by the other cam plates across the faces that were previously machined by the other tools. Thus, in the arrangement illustrated, grooving tool 172 is retracted out of groove 72 without retracting tools 90, 94 across the machined face 104 or tool 116 across the machined face 132. In the arrangement illustrated, tool 170 is retracted only partially across the previously machined face 176.

Thus, with the arrangement shown and described herein, when actuator 48 is shifted from a position wherein the leading end of the spirally grooved shaft portion 58 is adjacent the blind end of bore 62 to the position illustrated in FIG. 1, each of the cutting tools is actuated through its feed stroke because each of the cam plates 66, 68 and 70 are rotated in a counter-clockwise direction. Tools 90 and 94 are shifted radially inwardly from the broken line positions illustrated at 98, 100, respectively, to the solid line positions shown in FIG. 1 to machine the face 104. Tool 116 is shifted radially outwardly to the position shown in FIG. 1 to machine the face 132. Tool 70 is shifted radially inwardly to machine the face 176 and tool 172 is shifted radially outwardly to machine the groove 174. However, in the case of tools 170, 172 these tools are retracted slightly as the spirally grooved shaft portion 158 approaches the position shown in FIG. 1 so that the workpiece can be removed from the cutting head. After the workpiece 102 is removed, actuator 48 can be shifted from the position shown in FIG. 1 to a position wherein the leading end of the shaft 48 is adjacent the blind end of bore 62 to retract all of the tools to the starting position wherein the cam follower pins on each of the tool slides are retracted at the outer ends of the spiral cam grooves on each of the cam plates.

Although each of the cam plates 66, 68, 70 are keyed or otherwise fixedly mounted on shaft 38 for rotation in unison, this arrangement does not necessarily require that the feed stroke of all of the cutting tools be initiated at the same time or that all of the tools be fed at the same rate. The point in the rotation of each cam which determines when the feed stroke is initiated is determined by the shape of the spiral cam groove in each cam. For example, in the case of spiral grooves 72, 74 on cam plate 66 (FIG. 7) which control the radial movement of slides 78, 80, the outer end portion of each groove is concentric to the axis of shaft 38 between the points A and B which represents an angle of about 25° to 30°. From point B to the inner end of each spiral groove 72, 74 the grooves are inclined in a radially inward direction. Thus, in the case of slides 78, 80 the feed stroke is initiated after shaft 38 has rotated through approximately 30°.

In the case of cam groove 130 on cam plate 68 (FIG. 6) the outer end portion of the groove is concentric to the axis of shaft 38 from points C to D which is also in the neighborhood of 25° to 30°. Thus, the feed stroke of tool slide 110 is initiated at about the same point in the rotation of shaft 38 as tool slides 78, 80.

In the case of cam groove 152 on cam plate 70 (FIG. 3) the outer end portion of the groove is concentric to the axis of rotation of the head between the points E and F which is about 80° to 85°. Thus, the feed stroke of tool slide 140 is initiated long after the feed strokes of the other tools described are initiated. It is, therefore, apparent that the feed and retraction strokes of each tool slide can be initiated as desired. This is a very important feature of the present invention. In addition, the length of the stroke of each slide is independently controlled by the difference in radius between the inner end and the outer end of each spiral groove. Finally, the rate of feed of each slide can be independently controlled by the rate of curvature of the spiral groove controlling the slide.

We claim:

1. A machine tool comprising a rotatable head, a plurality of tool slides spaced axially along said head and guided for movement radially of said head, a cam associated with each tool slide, said cams being supported on said head for rotation relative to the head about the axis of rotation of the head, each cam having a generally spiral cam surface thereon lying in a plane generally perpendicular to said axis of rotation, a cam follower on each tool slide engaging the cam surface of its associated cam and adapted to shift the associated tool slide radially on said head at a rate determined by the shape of said cam surface when the cam is rotated relative to the head, a cutting tool on each slide adapted to execute a radial cut on a workpiece when the head is rotated and the tool slides shifted radially, means for rotating said head and means for rotating said cams relative to said head.

2. A machine tool as called for in claim 1 wherein said last-mentioned means are adapted to rotate all of said cams simultaneously.

3. A machine tool as called for in claim 1 wherein said last-mentioned means are adapted to rotate all of said cams simultaneously and at the same rate.

4. A machine tool as called for in claim 1 including a shaft extending axially of said head and journalled for rotation at the axis of rotation of said head, each of said cams being fixedly mounted on said shaft.

5. A machine tool as called for in claim 4 wherein said last-mentioned means comprises a nut fixed on said shaft, an axially reciprocable actuator having a helically threaded portion engaging said nut and adapted to rotate said nut when the actuator is shifted axially.

6. A machine tool as called for in claim 3 wherein said cams are provided with radially extending faces and said cam surfaces comprise grooves in said faces.

7. A machine tool as called for in claim 6 wherein said grooves have radially spaced side walls between which the cam follower is engaged.

8. A machine tool as called for in claim 7 wherein one of said tool slides has its center of gravity spaced radially in one direction from the axis of rotation of the head and has a cutting tool thereon spaced radially in the opposite direction from the axis of rotation of the head, the spiral groove of the cam associated with said one slide being adapted to shift said last-mentioned tool radially outwardly during the feed stroke thereof.

9. A machine tool as called for in claim 8 including spring means acting between said head and said one slide and urging said last-mentioned tool in a radially inward direction.

10. A cutting tool as called for in claim 7 wherein one of said slides has its center of gravity and a tool mounted thereon on the same radial side of the axis of rotation of the head, the spiral groove of the cam associated with said one slide being adapted to shift said last-mentioned tool radially inwardly during the feed stroke thereof.

11. A machine tool as called for in claim 7 wherein one of said slides has a recess formed therein located on the slide so as to remain at one side of the axis of rotation of the head throughout the stroke of the slide, said recess containing a sufficient quantity of relatively heavy material therein to locate the center of gravity of said slide at one side of the axis of rotation of the head throughout the stroke of the slide.

12. A machine tool as called for in claim 7 wherein the spiral groove in one cam radiates outwardly at a greater rate than the spiral groove in another cam.

13. A machine tool as called for in claim 7 wherein the spiral grooves in two of said cams are shaped so that the feed stroke of one of the tool slides is initiated prior to the feed stroke of the other slide.

14. A machine tool as called for in claim 7 wherein the tool on one of said slides comprises a grooving tool which is adapted to machine a groove in a workpiece when the tool is shifted in a radially outward direction, the terminal portion of the cam groove of the associated cam in the feed stroke direction being shaped to retract the grooving tool sufficiently to clear the inner edge of the groove machined by the grooving tool.

15. A machine tool as called for in claim 14 wherein the cam follower of said one slide is adapted to shift the grooving tool radially outwardly as the cam follower traverses one portion of the groove in a radially inward direction, said spiral groove having a radially innermost end portion which is located on a circle radially intermediate the opposite ends of the groove.

References Cited

UNITED STATES PATENTS

| 2,253,028 | 8/1941 | Hassig | 77—58.36 |
| 2,867,139 | 1/1959 | Caldwell | 77—58.4 |
| 2,991,670 | 7/1961 | Snell | 77—58.4 |
| 3,254,548 | 6/1966 | Gersch | 77—58.34 |

GERALD A. DOST, *Primary Examiner.*

U.S. Cl. X.R.

77—3